(12) United States Patent
Tran et al.

(10) Patent No.: US 6,955,853 B1
(45) Date of Patent: Oct. 18, 2005

(54) SECONDARY POLYMER LAYERED IMPREGNATED TILE

(75) Inventors: Huy K. Tran, Mountain View, CA (US); Daniel J. Rasky, Palo Alto, CA (US); Christine E. Szalai, Santa Clara, CA (US); Joseph A. Carroll, Chula Vista, CA (US); Ming-ta S. Hsu, San Jose, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/868,450

(22) Filed: Jun. 9, 2004

(51) Int. Cl.[7] .............................................. B32B 18/00
(52) U.S. Cl. ..................... 428/325; 428/36.4; 428/220; 428/312.4; 428/315.5; 428/317.9; 428/339; 428/408
(58) Field of Search ................ 428/408, 34.1, 428/34.4, 212, 213, 34.5, 325, 36.4, 220, 428/312.4, 315.5, 317.9, 339

(56) References Cited

U.S. PATENT DOCUMENTS

| | | | |
|---|---|---|---|
| 3,952,083 A | 4/1976 | Fletcher et al. | 428/218 |
| 4,148,962 A | 4/1979 | Frosch et al. | 428/218 |
| 5,536,562 A | 7/1996 | Tran et al. | 428/218 |
| 5,830,548 A * | 11/1998 | Andersen et al. | 428/36.4 |
| 6,395,396 B1 * | 5/2002 | Hanse | 428/408 |

* cited by examiner

*Primary Examiner*—Merrick Dixon
(74) *Attorney, Agent, or Firm*—Robert M. Padilla; John F. Schipper (57) ABSTRACT

A low density organic polymer impregnated preformed fibrous ceramic article includes a plurality of layers. A front layer includes ceramic fibers or carbon fibers or combinations of ceramic fibers and carbon fibers, and is impregnated with an effective amount of at least one organic polymer. A middle layer includes polymer impregnated ceramic fibers. A back layer includes ceramic fibers or carbon fibers or combinations of ceramic fibers and carbon fibers, and is impregnated with an effective amount of at least one low temperature pyrolyzing organic polymer capable of decomposing without depositing residues.

4 Claims, 6 Drawing Sheets

SECONDARY POLYMER LAYERED IMPREGNATED TILE

ORIGIN OF THE INVENTION

The invention disclosed herein was made in the performance of work under a NASA Contract and is subject to Public Law 96–517 (35 U.S.C. §200 et seq.). The contractor has not elected to retain title in this invention.

BACKGROUND OF THE INVENTION

1. Field of the Invention

This invention relates to low density polymeric resin impregnated ceramic articles comprising a plurality of layers of polymer impregnated ceramic fibers e.g. tile wherein the back layer of fibers of the multilayered article is impregnated with a low temperature pyrolyzing organic polymer and to the method for making the ceramic articles. The resin or polymer impregnated ceramic articles are particularly useful as structural ceramic ablators in thermal protection systems (TPS) such as an ablative heat shield for high speed atmospheric entry vehicles. The ceramic articles of this invention are structurally stable, and can be easily manufactured to accommodate specific end-use requirements. Other uses for the polymeric resin impregnated ceramic articles of this invention include various fire retardant structures, reusable thermal protection systems (TPS) for the next generation Space Shuttle and light weight structural components for the automotive and space industries.

2. Description of the Related Art

In general, the art discloses both ablative and reusable TPS. One mechanism of rejecting heat at the front surface by a TPS material is by ablation. The ablation process absorbs a significant amount of convective heating by gas pyrolysis, decomposition and sublimation of materials at the front surface of the TPS. The remainder of the heat is conducted through the materials. For reusable TPS materials, the convective heating is rejected mostly due to re-radiation and conduction through the materials. In both cases, additional material thickness is required to keep the space vehicle structure below the critical design limit. It is the additional thickness of the material that imposes a large weight penalty for a spacecraft flying a long heat pulse trajectory, e.g., very high heat load. For these types of missions, the prior art reusable and ablative TPS use thick and consequently heavy refractory-fiber "tile" insulation to limit heat conduction to the structure. Both the ablative and reusable TPS are thick and therefore the heat shield weight occupies a large fraction of the total vehicle weight. This increased weight limits the weight of scientific payload. When using tile TPS, the thickness makes the tile less flexible and increases material cost. This requires either a more rigid structure, if the tile is direct-bonded, or a strain isolating pad.

More specifically, ablative polymers and polymeric composites comprising ceramic fibers serve an important function in aerospace technology. The composites protect aerodynamic surfaces, propulsion structures, and ground equipment from the degradative effects of very high temperatures. This protection is accomplished by a self regulating heat and mass transfer process known as ablation. High density ablators having a density of about 1.1–1.9 g/cc (68.6–118 $lb_m/ft^3$) have been developed with various polymers such as the epoxy, phenolic, and silicone reinforced with fibers such as asbestos fibers, graphite cloth, silica cloth, etc. by known processes. Low density ablators, for example, comprise polymers, silica or phenolic microballons filled with chopped ceramic fibers and/or a honeycomb structure for reinforcement. The principal heat protection of these ablators is provided by the polymer and high level of carbon char formed as a residue during the ablation process. The heat dissipation is due to heat absorption from depolymerization and gas pyrolysis, re-radiation from the char layer, and convective heat blockage from pyrolysis gas blowing in the boundary layer.

During the early years of Space Shuttle heat shield development, passive transpiration systems were proposed. The system included a low density, high temperature ceramic matrix, such as silica, carbon, potassium titanate, or graphite, impregnated with coolants such as polyethylene, or an epoxy, acrylic, or phenolic. The passive transpiration systems increases the heat rate capability of the ceramic substrate by addition of an organic coolant which functions as a transpirant. The disadvantage is that the high density of the final product increases the overall thermal conductivity of the system. In addition, because the organic coolant fills the void volume of the ceramic fiber matrix, the organic coolant acts as an effective conduction path. Conventional ablators are generally manufactured in a process wherein the polymers and other components, such as the microballons and the reinforced fibers, are uniformly mixed and cured. These products have a uniform density, however, which is a disadvantage in economizing the vehicle's weight. One of the primary purposes of this invention is to decrease the overall TPS weight by having a density gradient along the heat shield thickness, e.g., high density at the outer surface where needed and very low density near the vehicle structure. Another purpose of this invention is to provide ablating performance on the outer surface and a transpirative coolant on the inner surface.

Specific details regarding ceramic heat shields and ablative structures are disclosed, for example, in various U.S. patents. U.S. Pat. No. 4,713,275 relates to a ceramic tile for use in a thermal protection system, employing a ceramic cloth having additional ceramic material deposited therein. U.S. Pat. No. 4,804,571 relates to a thermal protection system for reentry vehicles or high speed aircraft including multiple refractory tiles of varying thickness defined by thermal requirements at the point of installation. U.S. Pat. No. 4,031,059 relates to low-density ablators comprising a siloxane resin and a low-density filler including ground cork, silica or glass microspheres and hollow phenolic resin microballons. The ablator may further contain carbon and/or silica fibers. U.S. Pat. No. 4,100,322 relates to a high thermal capacity fiber-resin-carbon composite ablator having a polymer resin filler. The composite is prepared by impregnating a woven fabric of carbon or graphite yarn with a resin, curing the resin, pyrolyzing the impregnated fabric and re-impregnating the resulting fiber-porous carbon char composite with resin. U.S. Pat. No. 4,605,594 relates to a ceramic article including a woven ceramic cloth having a non-porous core and a porous periphery prepared by treating with an acid. The porous periphery can be infiltrated with materials such as a metal, a metal oxide, a catalyst and an elastomer. The articles can be used as fiber optic elements, catalyst supports and heat resistant tiles for aerospace purposes. U.S. Pat. No. 5,154,787 describes a method of manufacturing prepreg mats. A prepreg strand formed of inorganic fibers impregnated with a thermoplastic binder or a ceramic matrix powder is heated, cooled and compacted to fuse into a uniform, dense prepreg mat. U.S. Pat. No. 3,533,813 relates to a low density, nonstructural ceramic employing a porous ceramic support in combination with organic fillers. The process includes burning off the organics to form pores within the ceramic. This process reduces the mass of the composite, thereby reducing its density while maintaining inherent strength. U.S. Pat. No. 5,536,562 describes low density resin impregnated ceramic articles and a method for making the same.

SUMMARY OF THE INVENTION

This invention relates to a low density organic polymer impregnated ceramic article comprising a plurality of distinct layers of ceramic fibers wherein the outer or front layer of the article comprises fibers selected from the group consisting of ceramic fibers, carbon fibers and various combinations of ceramic and carbon fibers in various ratios. The front layer of fibers e.g. in the form of tile is impregnated with effective amounts of at least one organic polymer e.g. from 35 to 70% by wt. The middle layer comprises polymer impregnated ceramic fibers or tile. The back layer of fibers, adjacent to the structure of the vehicle, comprises fibers selected from the group consisting of ceramic fibers, carbon fibers, and combinations of ceramic and carbon fibers in any ratio. The back layer of the article comprising ceramic fibers impregnated with effective amounts e.g. up to about 40% by weight of at least one low temperature, pyrolyzing organic polymer which is capable of decomposing without depositing any residues.

As an alternative, the low density organic polymer impregnated ceramic article may comprise only two layers of ceramic fibers wherein the front layer of the article contains fibers selected from the group consisting of ceramic fibers, carbon fibers, and a combination of ceramic and carbon fibers in any ratio. The front layer of fibers is impregnated with effective amounts e.g. up to about 70% by weight of at least one organic polymer. The fibers of the back layer are also selected from the group consisting of ceramic fibers, carbon fibers, and combinations of ceramic and carbon fibers in any ratio. The back layer of the article, however, comprises ceramic fibers impregnated with effective amounts e.g. up to about 40% by weight of at least one organic polymer capable of decomposing without depositing residues and is characterized as a low temperature pyrolyzing polymer.

Accordingly, a primary object of this invention is to provide a low-density polymer impregnated ceramic article comprising a plurality of layers of polymer impregnated ceramic fibers, and to a method for making the article which has increased mechanical strength and enhanced thermal performance.

It is another object of this invention to provide a low-density, impregnated ceramic article comprising two layers of ceramic fiber which can survive severe heating environments wherein the back layer of ceramic fibers is impregnated with a low temperature pyrolyzing polymer that decomposes without depositing any residue.

It is another object of this invention to provide a low-density polymer impregnated ceramic article comprising a plurality of distinct layers of polymer impregnated ceramic fibers or tile having a large void volume to allow for enhanced gas percolation, prevent internal material cracking due to pyrolysis gas build-up, and maintain low thermal conductivity.

It is another object of this invention is to provide a low-density polymeric resin impregnated multilayered ceramic article as a component of a heat shield capable of forming a char layer at its surface, with enhanced surface toughness and a water-proof surface, wherein the ceramic portion remains structurally stable to provide support for the entire heat shield.

A further object of this invention is to provide a low-density polymer impregnated multilayered ceramic article wherein the polymeric resin is uniformly distributed throughout the front layer of the ceramic article.

A further object of this invention is to provide a low-density polymeric resin impregnated multilayered ceramic article, wherein the back layer of the ceramic article is impregnated with a low temperature pyrolyzing polymer that decomposes without depositing residue.

These and other objects of this invention will become apparent from a further and more detailed description of the invention.

BRIEF DESCRIPTION OF THE DRAWINGS

For a more complete understanding of the present invention, including its objects and attending benefits, reference should be made to the Detailed Description of the Invention, which is set forth below. This Detailed Description should be read together with the accompanying Drawings, wherein.

DETAILED DESCRIPTION OF THE INVENTION

The matrix of ceramic fibers e.g. tile used in preparing the ceramic article of this invention includes well developed, flight certified reusable surface insulations (RSI). These materials include silica and oxide developed for the Space Shuttle, with densities (prior to infiltrating with an organic resin) of 0.10–0.35 g/cc (6–22 $lb_m/ft^3$), and carbon fiber materials with densities of 0.15–0.20 g/cc (9–12 $lb_m/ft^3$). The term "matrix" of ceramic fibers (including carbon fibers) means a mechanically sound framework that is filled with air molecules and rigidized by ceramic and/or carbon fibers. The term "structural" ceramic ablator means a low density ablative material that has significant mechanical strength and does not require any additional material or mechanical means to support a heat shield.

The polymer or resin impregnated ceramic fibers i.e. ceramic substrate of this invention may be in the form of a tile, fabric, felt, tow, woven yarn or interlock fabric. The fibrous ceramic substrate generally has a thickness of from 1 to 200 cm, a length of from 1 to 200 cm and a width of from 1 to 200 cm. However, the dimensions are not particularly limited and may be tailored to specific end use. The ceramic fibers i.e. fibrous ceramic substrate of this invention include, for example, silicon carbide fibers, aluminum oxide fibers, aluminoborosilicate (ABS) fibers, silicon dioxide fibers, carbon fibers, zirconia fibers, zirconium dioxide fibers, silicon nitride fibers, silicon carbide fibers, aluminum oxide fibers, zirconium albuminate fibers, silicon carbide fibers and silicon carbide and nitride whiskers and the like. The preferred ceramic fibers include silicon dioxide (silica), zirconia, boria, hafnia, silicon carbide, carbon and aluminum oxide fibers. Different kinds of fibers may be used in combination to prepare the ceramic fiber substrate. A preferred combination comprises silica and carbon fibers. The ceramic fiber substrate may be prepared, from the above described fibers, in accordance with the technique described in U.S. Pat. No. 4,148,962 to Leiser et al and U.S. Pat. No. 3,952,083 to Fletcher et al the disclosures of which are incorporated herein by reference. The fibrous ceramic substrate (prior to impregnating with an organic polymeric resin) for use in this invention has a void volume fraction of from 70 to 96%, and preferably from 90 to 96%. The term "void volume fraction" means the ration of the volume of air space between fibers within the substrate to the total volume of the substrate.

The fibrous ceramic substrate (prior to infiltrating with a polymeric organic resin) has a density of from about 0.10 to about 0.40 g/cc, and preferably of from 0.13 g/cc to 0.23 g/cc. Specific examples of fibrous ceramic substrates include LI-900 made by Lockheed, having a density of 0.12–0.15 g/cc, and containing only $SiO_2$ fibers. There are 93–95% voids in this substrate. AETB-20 (Alumina Enhanced Thermal Barrier) developed by NASA Ames Research Center, and containing 12–15 wt % Nextel® fibers, 20 wt % alumina fibers and 62–65 wt % silica fibers. There are 94–95% voids in this substrate. AETB-50 (Alumina Enhanced Thermal Barrier) developed by NASA Ames Research Center, having a density of 0.13–0.15 g/cc and containing 15 wt % Nextel® fibers, 50 wt % alumina fibers and 35 wt % silica fibers. There are 95–96% voids in this substrate. AIM-10 (AMES Insulation Material) developed by NASA Ames Research Center, having density of 0.15–0.17 g/cc and containing 98.5% ultra microquartz fibers and 1.5% silicon carbide. There are 92–94% voids in this substrate. Light weight rigid carbon tile, commercially available as Fiberform®, has a density of 0.15–0.22 g/cc and contains only carbon fibers. There are 88–93% voids in this substrate. AIM-8 (AMES Insulation Material) developed by NASA AMES Research Center, has a density of 0.12–0.14 g/cc and contains 98.5% microquartz fibers and 1.5% silicon carbide. There are 93–95% voids in this substrate. This substrate was developed using a processing technique similar to that described in U.S. Pat. No. 3,952,083.

The organic polymeric resins used to impregnate the ceramic fibers of this invention includes thermoplastic polymeric resins and thermosetting polymeric resins. The term "thermoplastic resin" means a high molecular weight linear polymer, and the term "thermosetting resin" means a polymeric resin crosslinked by a curing agent and/or heat. Specific examples include PMMA (polymethylmethacrylate) thermoplastic resin having 0% char yield at above 550° C. in an inert atmosphere (e.g., nitrogen environment), commercially available as plexiglass. PBI (polybenzimidazole) resin, a thermoplastic polymer with 70% char yield in an inert atmosphere at a high temperature (>600° C.). Novolak epoxy thermosetting resin having 20–30% char yield at high temperature above 600° C. in an inert atmosphere. Phenolic thermosetting resin with 55–60% char yield at high temperature above 650° C. in an inert atmosphere. Polyarylacetylene thermosetting resin with 70–80% char yield at high temperature above 700° C. in an inert atmosphere. Silicone thermosetting resin with 60% char yield at high temperature above 600° C. in an inert atmosphere.

The low-density polymeric resin impregnated ceramic article of the invention are prepared with a solution containing the organic polymer. The fibrous ceramic substrate is immersed into the solution. The excess solution is removed after infiltration. With a thermoplastic polymer, the solvent is removed from the infiltrated ceramic substrate thereby leaving the desired amount of polymer. For a thermosetting polymer, the infiltrated ceramic substrate or fibers are partially cured to form a gel, in one embodiment of this invention, to provide a uniform distribution of the polymer within the fibrous matrix of the ceramic fibers. Alternatively, the solvent in the infiltrated ceramic substrate is rapidly removed (without first forming a gel) for a thermosetting polymer in another embodiment of this invention, to provide a density gradient of the polymer along at least one direction (e.g., the thickness direction between an outer surface and a center portion) of the ceramic substrate (non-uniform impregnation). For a thermoplastic polymer, a low molecular weight polymer is used as an infiltrate, and the solvent is rapidly removed to migrate the polymer from the center to the surface of the ceramic substrate (non-uniform). Thus, the surface of the substrate has a higher density than the center of the substrate. Thus the fibers in the ceramic matrix are, in effect, coated or impregnated with a thin film of the polymeric resin. The final product has a very low density with retention of a large void volume fraction (i.e., the ceramic substrate is only partially impregnated with an organic resin), good mechanical strength and good insulation properties.

In general the low-density resin impregnated ceramic articles of this invention comprise a matrix of ceramic fibers impregnated or coated with an organic polymeric resin and has an average density of from 0.15 g/cc to 0.4 g/cc and preferably from 0.17 g/cc to 0.3 g/cc, and an average void volume fraction of from 70% to 94%, preferably from 85% to 93%, and more preferably from 88% to 92%. The resin impregnated ceramic article contains ceramic fibers in an average amount of from 20 to 80 wt % and preferably from 40 to 70 wt % and an organic resin in an average amount of from 20 to 80 wt % and preferably from 30 to 60 wt %. For a uniform, low-density resin impregnated ceramic article, the difference in resin content between the center and outside portions thereof is within ±10 wt %, preferably within ±5 wt % and more preferably within ±3 wt % of the average resin content.

The non-uniform, low-density, multiple-layer polymeric resins impregnated ceramic articles of this invention have a density gradient along at least one direction thereof. The non-uniform impregnated ceramic articles have a high density at the outer surface and a low density near the vehicle structure (an opposing surface). In this embodiment, the resin impregnated ceramic article is cut in half to provide a high density surface and an opposing low density surface taken from a center portion of the ceramic article. Generally, the density at the outer surface is from 0.27 to 0.82 g/cc and preferably from 0.30 to 0.48 g/cc, and the density at the vehicle main structure (i.e., the opposing surface taken from a center portion of the resin impregnated ceramic article) is generally from 0.14 to 0.25 g/cc and preferably from 0.14 to 0.18 g/cc. To make a product containing a uniformly distributed thermoplastic resin within a low-density fibrous ceramic substrate, a viscous solution containing a high molecular weight resin (calculated concentration for the desired density) having a molecular weight of from $10^5$ to $10^7$ and preferably from $10^6$ to $10^7$ is employed as an infiltrant. In this regard, the volume and density of the ceramic substrate is calculated from a weight, length and diameter measurements. These measurements are used to determine the amount of resin and solvent needed for infiltration. The solvent should have a low boiling point, and the resin must be completely dissolved in the solvent. The viscosity of the prepared solution is preferably in the range of from 20,000–100,000 cps, more preferably from 30,000–70,000 cps by using a mixture of different molecular weight thermoplastics. If the viscosity of the solution is too high, the resin solution is not easily infiltrated into the center of the sample. If the viscosity of the solution is too low, the resin is carried out with the solvent upon evaporation, causing the product to be non-uniform.

The low-density fibrous ceramic substrate is evacuated generally at a vacuum of $\leq 1$ Torr and infiltrated with the resin solution for about 0.5 to 24 hrs. The type of vacuum pump used to evacuate the ceramic substrate (which ceramic substrate is typically placed within a vacuum container) is not particularly limited. The solvent is removed from the infiltrated ceramic substrate, e.g., by evaporation at room temperature (e.g., about 25° C.) and atmospheric pressure (about one atmosphere) or at a higher temperature of up to about 200° C. generally for about 24 to 36 hrs. depending on the type of solvent employed until a stable weight is achieved. The uniformity of the product is determined by measuring the resin content of the center and an outside portion of the product.

An alternate method for making a uniform thermoplastic product comprises infiltrating an evacuated low-density fibrous ceramic substrate with resin solution, and then dipping the product into a larger quantity of a non-solvent for the thermoplastic resin generally for about 2 to 24 hours to precipitate thermoplastic resin in place throughout the product. This process is especially useful for resins having a molecular weight of form $10^4$ to $10^5$, especially if the resin has low solubility at room temperature but has high solubility at higher temperature (e.g., PBI). The term "non-solvent" as employed herein means that the thermoplastic resin is soluble therein in an amount not exceeding 0.5 g/l at a temperature of 20°–30° C. Useful non-solvents for precipitating thermoplastic resin in place throughout the ceramic substrate can be, for example, water, and the lower alcohols e.g. methanol, ethanol and isopropanol.

To make a non-uniform product where a thermoplastic resin is distributed to provide a density gradient along the thickness of the ceramic substrate, a lower molecular weight resin having a molecular weight of from $10^3$ to less than $10^5$ and preferably from $10^4$ to less than $10^5$ is dissolved in a low boiling point solvent to obtain the desired solution concentration. The viscosity of the prepared solution is preferably in the range of from 1 to 1000 cps, more preferably from 10 to $10^3$ cps. After infiltration, the solvent is removed at a faster rate (than the case for a uniform sample) either by vacuum suction 0.1 to 10 Torr and/or at a higher temperature of from 30° to 200° C., preferably 30° to 150° C., to migrate the resin from the center to the surface of the product.

The low boiling solvent for use in preparing a solution of the thermoplastic resin infiltrant has a boiling point of from 50° to 150° C. Useful low boiling solvents include alcohol, acetone, methyl ethyl ketone (MEK), toluene, xylene and mixtures thereof. The concentration of thermoplastic resin in the infiltrating solution is generally from 7 wt % to 12 wt %. The preferred thermoplastic resins include PMMA, PBI, and polystyrene. Uncured thermosetting resin dissolved in a solvent has a very low viscosity. In accordance with the method of this invention, the fibrous ceramic substrate is infiltrated with resin solution. In order to make a uniform product, the infiltrated materials are partially cured (as submerged in the resin solution) to form a gel. This is followed by solvent removal and curing the resin to complete cross-linking of the thermosetting resin. The thermosetting resin is completely dissolved in a high boiling solvent with the desired concentration and used as the impregnant to infiltrate the ceramic substrate. After the substrate is infiltrated with the solution for about 0.5 to 24 hrs. under a vacuum of about $\leq 10$ Torr, the impregnated product is heated at a suitable temperature or microwaved to a temperature (at one atmosphere or higher pressure) below the boiling point of the solvent in a closed container (or in an autoclave near the boiling temperature of the solvent) until the thermosetting resin gels. The excess resin is removed and the solvent is removed by heating under vacuum. The sample is then further cured or post-cured according to the normal curing schedule of the resin.

The high boiling solvents have a boiling point of from 100° to 250° C. Useful high boiling solvents include methylisobutylketone (MIBK), ethylene glycol, dimethyl sulfoxide (DMSO), dimethyl formamide (DMF), dimethyl acetate (DMAC), xylene and toluene. The solvent selected depends on solubility and the gel temperature of the resin. The concentration of thermosetting resin in the solution is generally from 7 wt % to 12 wt %. The gelling temperature and time varies depending on the nature of the thermosetting resin, but generally is from 80° C. to 200° C. for a duration of from 1 to 24 hrs. After the product is gelled, the solvent is removed under vacuum ($\leq 100$ Torr) at 100° C.–200° C. depending on the solvent employed. Generally, several heating cycles are needed to complete the curing process depending on the resin employed. To make a non-uniform product where a thermosetting resin is distributed so as to provide a density gradient along the thickness of the ceramic substrate, the solvent is removed at 20° C.–200° C. with or without vacuum depending on the solvent employed without first forming an intermediate gel state. After removing the solvent from the impregnated substrate, the product is then cured according to the normal curing schedule of the resin.

One of the primary purposes of the invention is to allow the use of a much thinner and thus minimized Thermal Protection System (TPS) on reentry vehicles by limiting the maximum back face temperature adjacent the structure behind the TPS by a heat quenching concept. For purposes of this invention, the Secondary Polymer Layered Impregnated Tile (SPLIT) is a multilayer e.g. polymer impregnation into the ceramic fiber e.g. tile: The front layer of the article is impregnated with known polymers such as a silicone which is similar to the silicone impregnated reusable ceramic ablators (SIRCA), or a phenolic resin that is similar to the phenolic impregnated carbon ablators (PICA) which are members of the light weight ceramic ablators (LCA). The middle layer of fibers in this multi-layered article is "plain vanilla" tile which is a good insulation with minimum weight and provides a percolation path for secondary polymer to the surface. The middle layer of ceramic fibers can be eliminated in the 2-layer tile article. The back layer of fibers in the ceramic article are impregnated with at least one low temperature pyrolyzing organic polymer which is capable of completely decomposing at the backface temperatures without depositing any residue.

When heat conducting and diffusing through the tiles of the multilayered article reaches the back layer and when the back face temperature of the tile reaches the decomposition temperature of the low temperature pyrolyzing secondary polymer, the secondary polymer will pyrolyze and decompose endothermically. The endothermic reaction of the secondary polymer will absorb most of the heat waves that reaches the back surface and thereby keeps the back face temperature at the structure below about 125° C. This backface temperature is an acceptable temperature for either aluminum or composite structures. The pyrolysis gas products in effect cools the vehicle structure through transpiration cooling mechanism. At the same time, since most LCA materials are very porous, this allows the gas pyrolysis to percolate toward the surface giving additional heat rejection through transpiration cooling and boundary layer blockage.

More specifically, to prepare the low density polymer impregnated articles of this invention the ceramic and/or carbon fibers are formed into the desired finished or near-finished shape. The front layer of fibers of the preformed tile are impregnated with the primary polymers by the methods disclosed herein and more specifically by the methods taught in U.S. Pat. No. 5,536,562 the disclosure of which is incorporated herein by reference. The thickness or amount of infiltration is determined by the required aeroconvective heating environment. It is important, however, that the backside or back layer of fibers of the preformed tile are impregnated with the secondary polymers that are linearly chained polymers that have low pyrolyzing temperatures and very low to zero residue yield. Examples of these polymers are pmma (polymethylmethacrylate), and the lower olefins such as polyethylene, polystyrene, wax, etc. The low temperature pryolyzing polymers such as pmma and polystyrene decompose at 350 –450° C.; polyisoprene, polybutadiene decompose at 280–350° C.; High molecular weight hydrocarbons (molecular weight range 300–800) such as tetracosane and low molecular weight polyethylene with melting point at 50–150° C. and decomposition temperature at 200–300° C. can be used also to impregnate the back layer of fibers of the ceramic article. All of the low temperature pyrolyzing polymers, and other suitable polymers, can be used as secondary polymers including the low temperature pyrolyzing materials such as water-gel etc. The preferred polymers for impregnation of the front layer of fibers of the article include the phenolic resins, epoxy, PBI (polybenzimidazole), silicones such as GE RTV 655, 615, Dow Silgard 184, 182 etc. Subsequently, the low density polymer impregnated ceramic articles (SPLIT) are bonded to the structure using low or room temperature cured adhesive that do not exceed the softening temperature of the secondary polymers used to impregnate the back layer of the multilayered ceramic article. The primary polymers used to impregnate the front layer of the article serves the same function as it does for the LCA as taught in U.S. Pat. No. 5,536,562. It increases the thermal performance of the tile material without a coating, increases the strength capability, and the strain to failure. In accordance with this invention, aeroconvective heating is being rejected by gas pyrolysis and chemical converation at the surface to form a high emittance layer that is nearly non-catalytic. The SPLIT method of this invention relies on the concept that the impregnation of the front layer of fibers with the primary polymer is limited to the front portion of the heat shield, where ruggedness and high emittance are most useful.

The following examples illustrate the preparation of the low density polymeric resin impregnated articles of this invention.

EXAMPLE 1

A ceramic article was prepared from a split SIRCA (silicone impregnated reusable ceramic ablator)-PMMA with the PMMA (polymethylmethacrylate) on the bottom of RTV silicone resins using a one-step process. In the one-step process a PMMA solution in ketone (MEK or acetone) or toluene was mixed with RTV 655 (silicone resin) solution in the same solvent. The two polymer solutions will not completely mix to form a homogeneous solution. Instead, a two-layer solution is formed with PMMA on the bottom layer. The location of this boundary line separating the two solutes depends on the amount of the polymers. It is desirable to impregnate more concentrated PMMA near the bottom surface of the SIRCA sample. When a 40% PMMA solution in MEK and a 10% RTV 655 solution in MEK (solvent can also be toluene) are mixed with a volume ratio of 1:9, the boundary line is about ¼ volume from the bottom. A light-weight tile impregnated by the solution containing one part of 40% PMMA and nine parts of 10% RTV 655 by volume, after impregnation, let the sample stand up in the solution for about 2 hours until the boundary layer line appears. The sample was then placed in a high temperature nylon bag and heated at 100° C. for 2–20 hours to cure the RTV. After the RTV is gelled, the sample is placed in a vacuum oven to remove the solvent. A thermogravimetric (TGA) curve shows that the bottom ¼ of the sample contains primarily PMMA and the top ¾ contains primarily RTV 655. The problem with the one-step process is that the process cannot infiltrate more PMMA on the surface of the product and it is hard to control the boundary line of the two solutions. The boundary line depends on the concentration and the amount of the two resin solutions. To solve this problem, a two-step process was developed.

Figure 1:
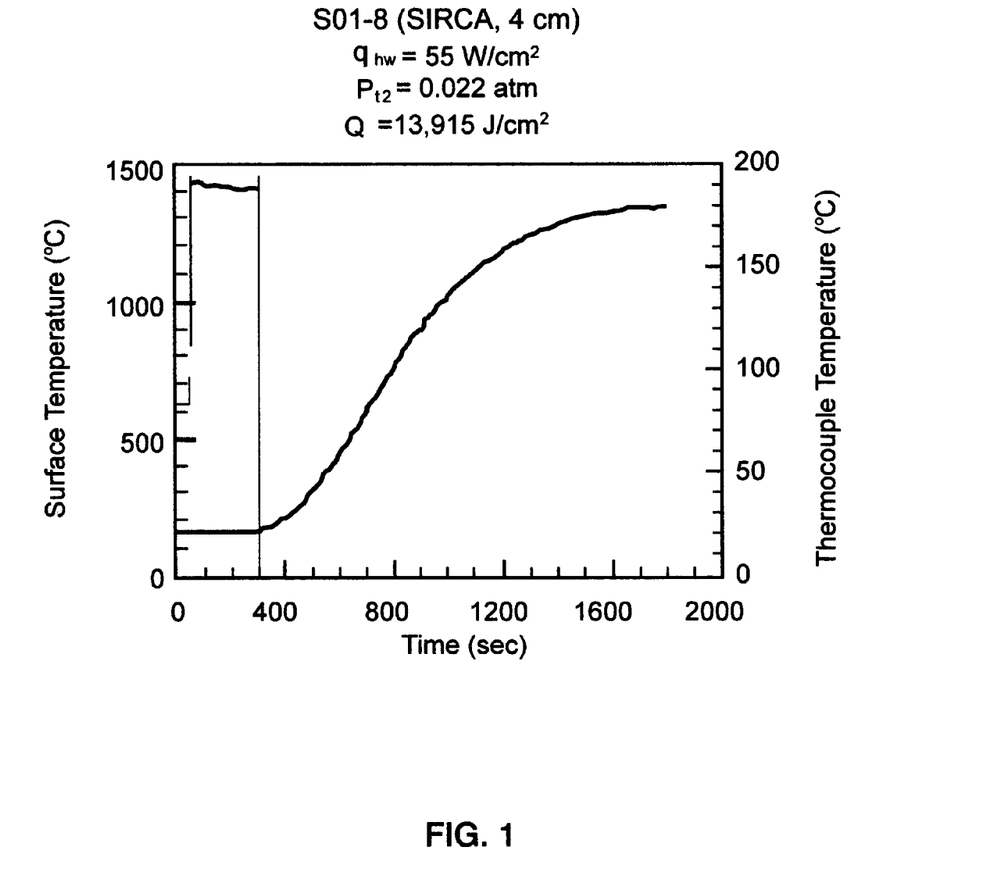
FIG. 1 is a plot showing the temperature response of a silicone-impregnated reusable ceramic ablator (SIRCA) material, tested at heating conditions for Mars 2001 during the aerocapturing maneuver.
Figure 2:
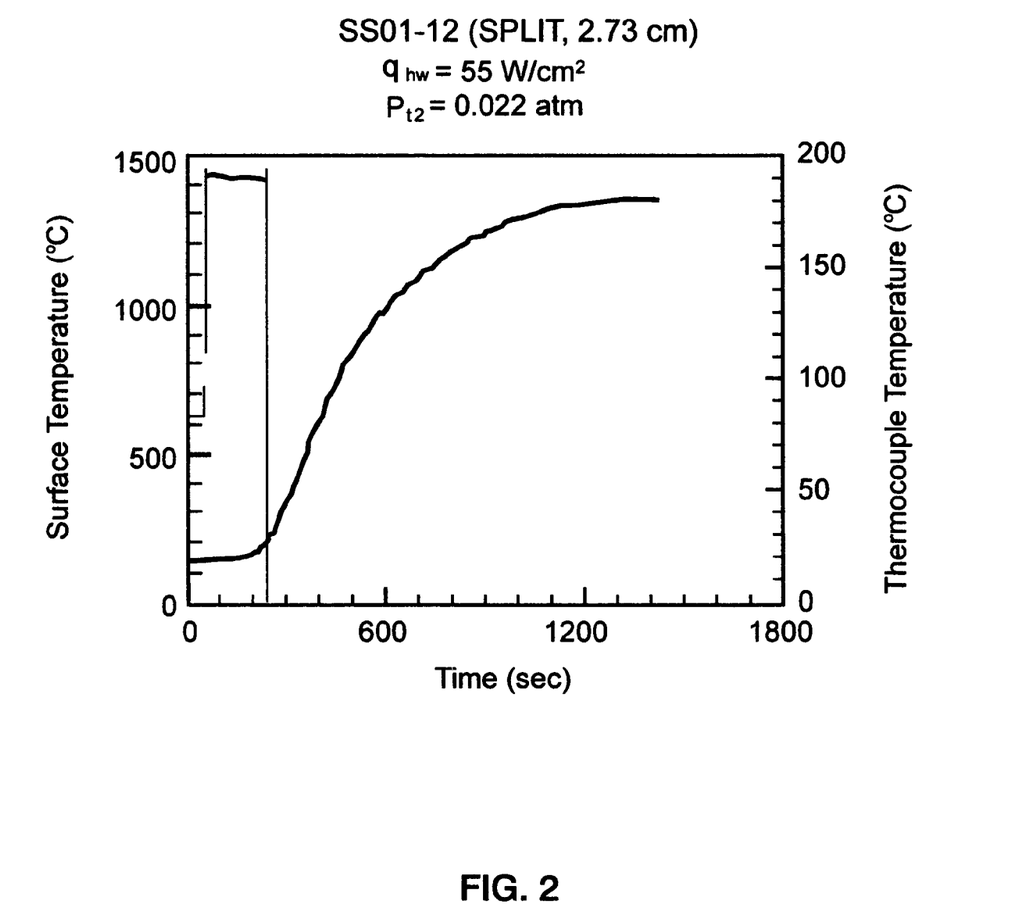
FIG. 2 is a plot showing the temperature response of a silicone-impregnated reusable ceramic ablator/secondary polymer layered impregnated tile (SIRCA/SPLIT) material, tested at heating conditions for Mars 2001 during the aerocapturing maneuver.

The data in FIGS. 1 and 2 show the temperature response of SIRCA and SIRCA-SPLIT materials. These materials were tested at heating condition for Mars 2001 during the aerocapturing maneuver. As shown in FIGS. 1 & 2, the materials have similar back force temperature with a SIRCA thickness of 4.0 cm and a SIRCA-SPLIT thickness of 2.73 cm., which is a difference of 30% in thickness. The SIRCA material has an overall density of 0.24 g/cc and SIRCA/SPLIT of 0.21 g/cc. These results showed a significant improvement and weight saving that the SPLIT process offers compared to the mono-polymer impregnated ceramic article.

FIG. 1 is a plot of the Arc-jet data for the Mars 2001 Aerocapturing Heating Condition, wherein the baseline material is SIRCA with uniform infiltration of silicone, and the material has an overall density of 0.25 g/cc. The dimensions of the baseline test model are 10.16 cm in diameter, and 4 cm in thickness. The model is instrumented with two types of K thermocouples on the back surface.

FIG. 2 is a plot of the Arc-jet test data for the Mars 2001 Aerocapturing Heating Condition, employing a SIRCA/SPLIT model which was 2.73 cm thick. The test model was prepared as described above according to the present invention. It had the same diameter as the baseline; however it had a thickness of 2.73 cm. This model was exposed to the same test conditions as the SIRCA baseline model.

FIGS. 1 and 2 indicated that the back face temperatures obtained from both models are essentially the same. However, the SIRFA/SPLIT model thickness is 32% less than that of the SIRCA test model. Since both materials have the density of 0.25 g/cc, the lower thickness requirement for SIRCA/SPLIT would have resulted in total weight saving of 32% for the heat shield. This potential weight saving would significantly increase the scientific payload for a proposed mission. The Mars Pathfinder Rover, Sojourner weight is 11 kg. Currently, the heat shield weight of a typical planetary entry spacecraft is about 45 to 50% of the total spacecraft weight (Galileo is about 51%, and Mars spacecraft is about 45%). It was discovered through this work that for a low heat flux and low heat load, the SPLIT material preformed similarly to the uniform single polymer infiltrate material. At high heat loads, the thinner SPLIT material performed better than the baseline materials.

EXAMPLE 2

In the two-step process, a solution of 30–40% PMMA in MEK (or in toluene) was prepared by dissolving 30–40 g of PMMA (mol. Weight=75000) in 70–60 g of solvent. A calculated amount (depending on the area and the desired depth of the PMMA penetration) of PMMA solution was impregnated on the front surface of the tile. After the solvent evaporated, the rest of the tile (the other side) was impregnated with an RTV 655 solution, then cured and dried. A TGA analyses of the dried sample showed that the bottom surface (0.1") of the tile was primarily impregnated with PMMA and the rest of the tile was impregnated with RTV 655. An alternative two-step process was to brush the desired amount of PMMA solution on top of SIRCA tiles by brushing the same amount of solvent first. Toluene and alcohol solvents are preferred. If solvent evaporated before the desired amount of PMMA solution is brushed on, more solvent must be applied. Several cornicle cone shaped SIRCAs and split PMMA-SIRCAs were prepared.

Figure 3:
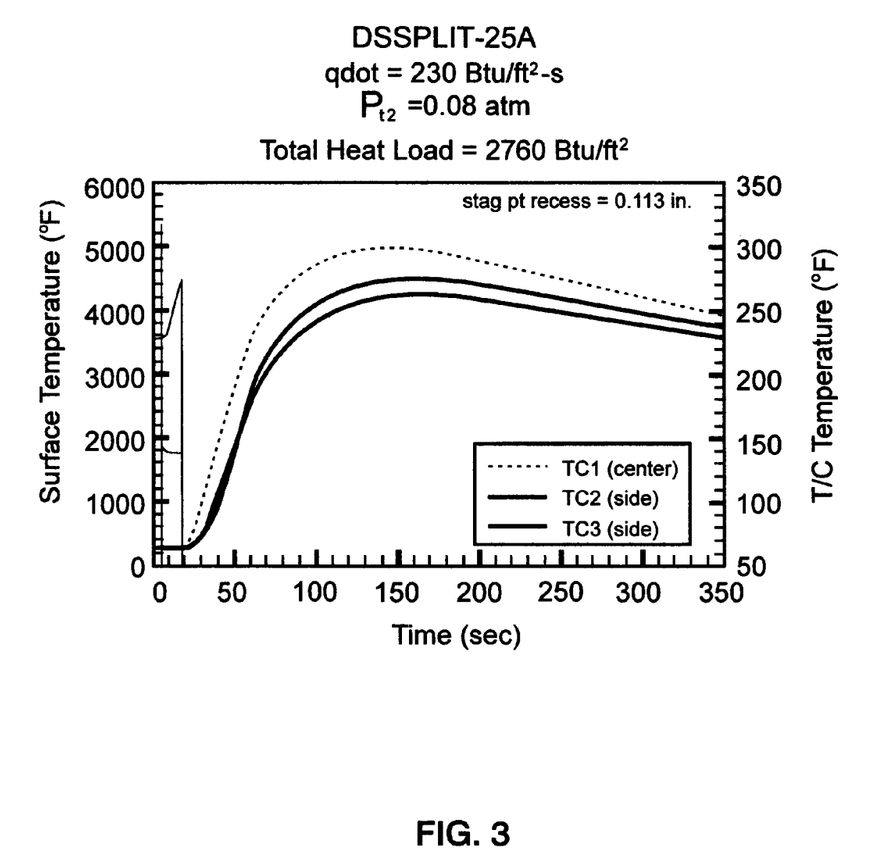
FIG. 3 is a plot showing the temperature response of a SIRCA/SPLIT material wherein the secondary polymer is at the front surface, and primary polymer impregnation was performed with gradient density from the front to back surface.

FIG. 3 shows the test results of the SIRCA/SPLIT when the secondary polymer is at the front surface, and primary polymer impregnation was performed with gradient density from the front to back surface. The density of the overall model was 0.25 g/cc. The test result showed that the addition of the secondary polymer aided the ablation performance of the SIRCA material. The secondary polymer at the surface provided extra protection in (i) transpiration cooling effect and (ii) addition charring density to the surface, thus reducing the recession rate at the surface. The second mechanism generally occurred when the polymer was exposed to a high heating rate. In the process of pyrolyzing, the heating was high enough that it cracked the thermoplastic molecules. This phenomenon is known as molecular cracking and is well documented.

FIG. 3 shows the arc-jet results on the SIRCA/SPLIT material with PMMA as secondary layer impregnation on the front surface. The model was tested at heating rates for the Mars 98 microprobe.

Another advantage of using the SPLIT method is to enhance the thermal and ablation performance of the SIRCA material. During entry to the Martian atmosphere, the aeroshell of the mars microprobe experiences a peak heating rate of 200 m/cm$^2$. At this heating rate, SIRCA and other conventional ablative materials (SIA-561V, arcoat) experience a very high remission. The microprobe's mission objective is to penetrate the Martian soil to perform soil analysis. In order to minimize the error during the penetration, the TPS of the aeroshell should have a minimum shape change. The application of SPLIT on the front surface of SIRCA will afford a reduced surface recession of SIRCA and reduced back force temperature. FIG. 3 shows the surface recession and thermal response of SIRCA and SIRCA-SPLIT as a function of time.

EXAMPLE 3

When a PMMA solution as used to impregnate the PICA (phenolic impregnated carbon ablators) tile, the solvent (MEK or acetone) evaporated very fact. A PMMA film immediately forms on the surface which prevents further PMMA solution from penetrating into the PICA tile. It evaporates moderately when toluene is used as a solvent. A 30% PMMA (molecular weight of 75000) in toluene is coated on the surface of a PICA tile in about 0.1" depth, and then dried at room temperature. Several PICA and split PMMA-PICA products were made and subjected to the arc-jet tests.

Figure 4:
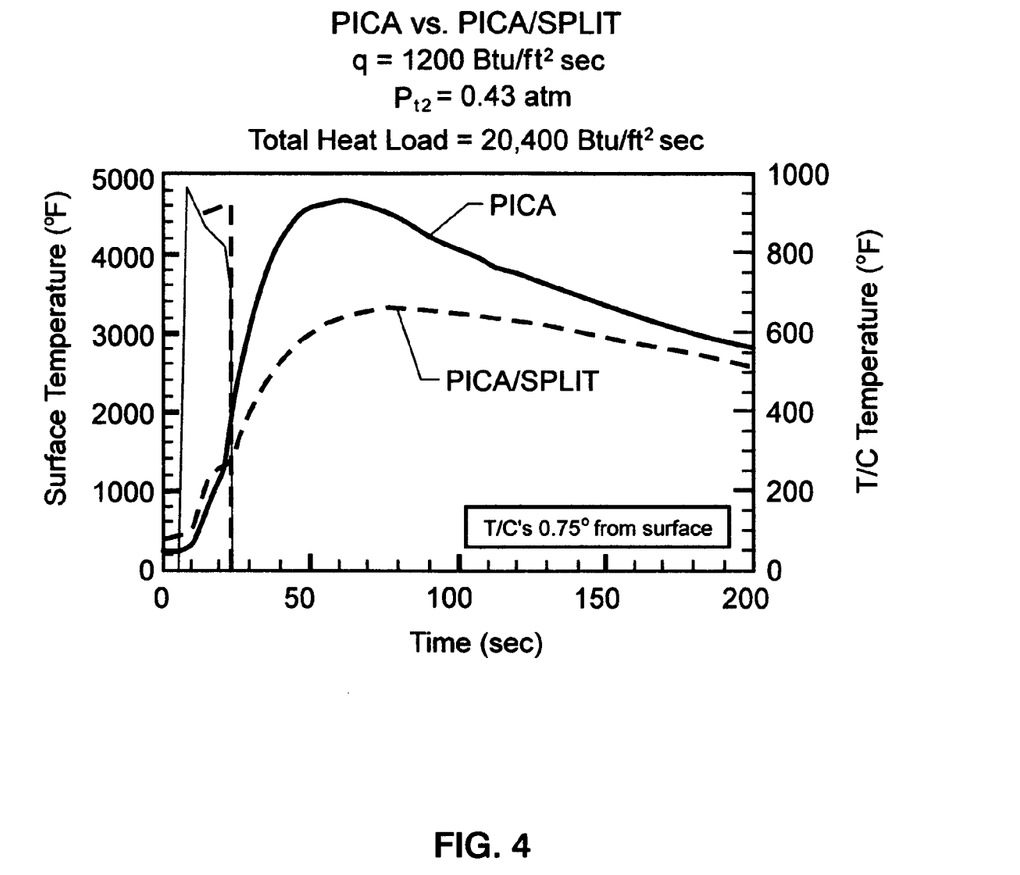
FIG. 4 is a plot showing the temperature response of two sets of models: one for a baseline phenolic-impregnated carbon ablator (PICA) material, and one for a PICA/SPLIT material.

FIG. 4 shows the improvement that the PICA/SPLIT material afforded compared to the PICA material. Both materials had the same thickness and were exposed to the same heating environment. FIG. 4 shows the arc-jet data of PICA-15 (mono-polymer impregnation) and PICA/SPLIT at earth entry condition for a comet sample return capsule.

Two sets of models (one for baseline PICA material and one for PICA/SPLIT material) were prepared with the same diameter and thickness and instrumentation (i.e. thermocouple location within the model). The heating condition chosen for this test series represents the typical earth re-entry condition of comet sample return mission such as the Stardust mission. As shown in FIG. 4, the in-depth temperature for the PICA/SPLIT material is much lower than that of the baseline PICA material—an almost 50% improvement in temperature response. The temperature profiles plotted on second y-axis showed that, at 1.905 cm (0.75") from the surface, the decomposition of secondary polymer in PICA/SPLIT absorbed significant energy, and the gas pyrolysis percolating out of the front surface provided a transpiration cooling effect to the internal matrix of the material.

EXAMPLE 4

Several mushroom carbon fiber tiles were impregnated with a phenolic resin to form PICA in the mushroom head and the stems were impregnated with PMMA toluene solution. After cured and dried some tip (½") of the mushroom heads were also densified with a 32% phenolic resin solution to 30–35 lb/ft$^3$ and some tip of the mushrooms were densified with a neat phenolic resin to about 50 lb/ft$^3$. The split PMMA-PICA products were prepared and subjected to the arc-jet test. This impregnation technique allows the surface to have a high density, enabling the material to withstand a higher stagnation pressure during entry. This is important for sample return missions, and will open up the flight envelope, which is highly desired by mission designers.

Figure 5:
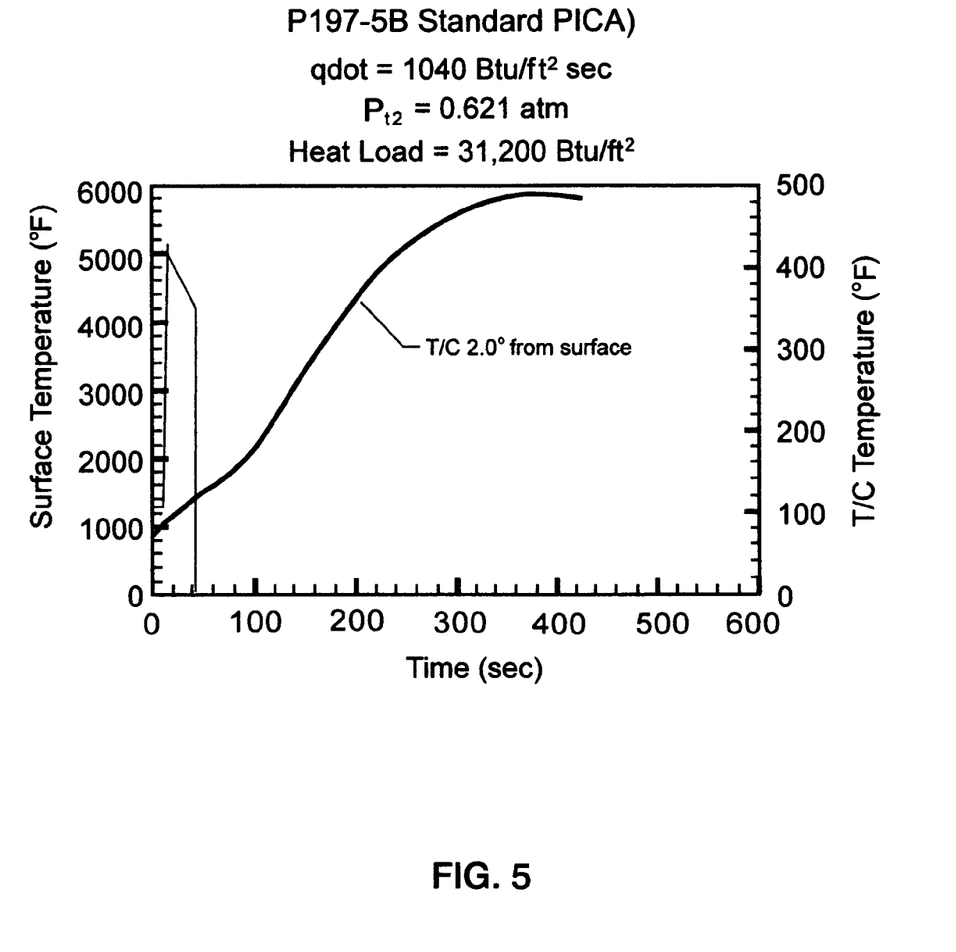
FIG. 5 is a plot showing the back surface temperature response of a PICA material.
Figure 6:
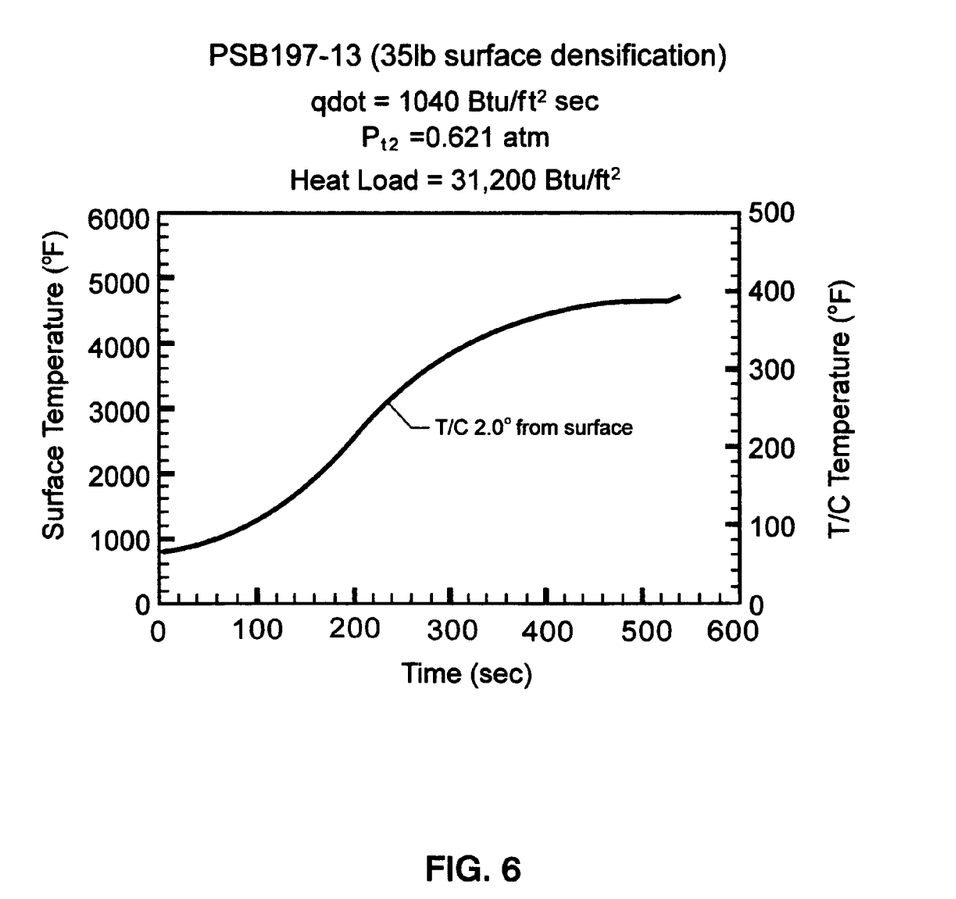
FIG. 6 is a plot showing the temperature response of a PICA/SPLIT material with surface densification.

FIGS. 5 and 6 show the thermal response of the PICA and PICA/SPLIT with surface densification, respectively. At high stagnation pressures and high heating rates, the mono-polymer impregnated ceramic article (PICA baseline material) begins to spall, however, due to mechanical failure at the surface. Surface densification of the front surface however, reduces hot gas ingestion phenomenon, increases mechanical strength at the surface, and reduces the ablation rate. The SPLIT portion of the back quenches the heat wave from the surface by pyrolyzing the secondary polymer. The gas pyrolysis from PMMA (in this case) percolates through the thickness and provides extra transpiration cooling at the surface which in turn reduces the overall heating at the surface. FIG. 5 shows the back surface temperature response of the mono-polymer impregnated carbon article (PICA). FIG. 6 shows the back face temperature of PICA/SPLIT with surface densification. Arc-jet data are from the model that was tested at heating rates for the Mars Sample Return Vehicle.

It was discovered that the secondary polymer layer impregnation becomes more effective at a higher heating condition and with a fibrous carbon matrix. This is due to the internal heat conduction occurring much faster, and therefore the heat wave moves through material at the earlier stage of the entry heating profile. As the heat wave moves through the material, it is absorbed by the secondary polymer, which produces gas pyrolysis percolating to the surface, providing an extra heat reduction mechanism to the surface through transpiration cooling and boundary layer blockage. In the described test series, PICA/SPLIT consistently showed lower in-depth and back surface temperature than that of the mono-polymer baseline PICA material.

For purposes of this invention, it is preferred that the secondary polymers in the back layer of fibers be impregnated near the back surface of the tile rather than throughout the thickness thereof, because in most cases the heat conducted to the back surface is comparatively small due to the low thermal conductivity of the LCA material. Minimizing the amount of secondary polymer infiltrant is a two fold benefit. First, any additional loading of polymer in the back layer will increase both density and thermal conductivity and thus increase the overall vehicle weight. On the other hand, the polymer impregnation must be kept porous enough at the very back to allow the tile/structure bond layer to form a mechanical interlock into the tile that will remain when the secondary polymer decomposes and leaves the tile. The total TPS weight should be at a minimum when nearly half the total mass is secondary polymer, but where minimum thickness is also a goal, then even higher secondary polymer mass fractions may be justified.

As an alternative embodiments, the back surface of the ceramic article can be exposed to intense heat e.g. a torch to remove the secondary polymer from the thin back layer of fiber, so a good tile/structure bond is possible even with a dense secondary polymer layer. Formation of shallow passages in the TPS or mating structure allows resupply of the secondary polymer and evacuation of solvent after each mission, makes the SPLIT reusable. The silicone impregnation depth is regulated, in the front layer, and then the immiscibility of impregnants can be used to regulate secondary polymer impregnation depth in the back layer. This "two-layer" embodiment could be particularly useful where convenient and uniform reimpregnation is desired between flights. Impregnate the back of the permeable insulation, inorganic or organic, flexible or rigid. Impregnate the secondary polymer into a "strain isolation pad" or other separate porous layer behind the main insulation. (This requires a permeable bond between the two layers). Use other ablantants for higher or lower decomposition temperatures of other properties.

The secondary polymer layered impregnation tile (SPLIT) concept of this invention improves on non-ablating and ablating TPS by allowing use of a much thinner heat shield material in three major ways. SPLIT enables entry condition with high heat load such as aerobraking with minimum thickness. At high heating condition, the gas pyrolysis percolating through the porous ablative material experiences "molecular cracking" and thus strengthens the charred surface. The SPLIT ablantant limits the peak backface temperature during and after reentry to ~125 C. Compared to the prior art, the SPLIT concept of this invention reduces the thickness and weight by more than a factor of two, while simultaneously reducing peak backface temperatures. The lower peak structure temperature allows use of lower-cost and easier-to-use composite matrix materials and may also relax some constraints on vehicle design and operations.

The novel process of this invention is to impregnate a low-temperature pyrolyzing secondary polymer into the back layer of a porous preformed rigid and flexible TPS to quench the heat soak. This method allows self-regulating transpiration that limits backface temperatures at the structure to a design limit temperature of the structure without massive addition to the TPS thickness. This invention recognizes that the impregnation of polymers into the ceramic fibers should be limited to the front and back surface regions; thereby minimizing the weight of the ceramic article. By using a silicone impregnation, for example, one can control the depth of subsequent secondary polymers with low pyrolyzing temperature to quench the heat wave coming from the front face and thereby keep the back face temperature low.

While this invention has been described by a number of specific examples, it is obvious that there are other modifications that can be made without departing from the sprit and scope of the appended claims.

We claim:

1. A low density organic polymer impregnated preformed fibrous ceramic article comprising a plurality of layers wherein (A) a front layer of the article comprises fibers selected from the group consisting of ceramic fibers, carbon fibers and combinations of ceramic and carbon fibers; said front layer being impregnated with an amount of at least one organic polymer; (B) a middle layer comprising polymer impregnated ceramic fibers; and (C) a back layer comprising fibers selected from the group consisting of ceramic fibers, carbon fibers, and combinations of ceramic and carbon fibers; said back layer of the article comprising fibers impregnated with an amount of at least one low temperature pyrolyzing organic polymer capable of decomposing without depositing residues, wherein said polymer impregnated ceramic fibers in said middle layer include one of the following groups of fibers; (1) 12–15 weight percent Nextel fibers, 20 weight-percent alumina and 63–65 weight-percent silica fibers and having a void fraction in a range of about 95–95 percent; (2) 12–15 weight percent Nextel fibers, 50 weight-percent alumina and 35 weight-percent silica fibers and having a void fraction in a range of about 95–96 percent; (3) about 98.5 percent ultra microquartz and about 1.5 percent silicon carbide, having a density of 0.15–0.17 gm/cm$^3$, and having a void fraction in a range of about 92–94 percent; (4) about 98.5 percent ultra microquartz and about 1.5 percent silicon carbide, having a density of 0.12–0.14 gm/cm$^3$, and having a void fraction in a range of about 93–95 percent; and (5) all carbon fibers and having a void fraction in a range of 88–93 percent.

2. The organic polymer impregnated preformed fibrous ceramic article of claim 1, wherein the front layer of the article comprises ceramic fibers impregnated with a thermoplastic polymer.

3. The organic polymer impregnated preformed fibrous ceramic article of claim 1, wherein the front layer of the article comprises ceramic fibers impregnated with a thermosetting polymer.

4. The organic polymer impregnated preformed fibrous ceramic article of claim 1, wherein the front layer comprises ceramic fibers impregnated with a material which forms a gel.

* * * * *